United States Patent
Baker et al.

[15] 3,669,939
[45] June 13, 1972

[54] CONDENSATION POLYMERS

[72] Inventors: Alan Stuart Baker, Slough; Derek John Walbridge, Beaconsfield, both of England

[73] Assignee: Imperial Chemical Industries Limited, London, England

[22] Filed: July 6, 1970

[21] Appl. No.: 52,692

[30] Foreign Application Priority Data

June 16, 1970 Great Britain......................29,125/70

[52] U.S. Cl..................260/78 A, 117/161 K, 260/78 SC, 260/78.3 R, 260/484, 260/857, 260/874
[51] Int. Cl.......................................................C08g 17/02
[58] Field of Search................260/78.3 R, 18 R, 407, 484 A, 260/78 A

[56] References Cited

UNITED STATES PATENTS

| | | | |
|---|---|---|---|
| 2,311,534 | 2/1943 | Gleason | 260/78 |
| 2,752,391 | 6/1956 | Gilbert et al. | 260/535 |
| 1,835,203 | 12/1931 | Bruson | 260/78.3 |

OTHER PUBLICATIONS

Morris et al., " Polymers Derived from 9,10-dihydroxystearic Acid," Journal of American Oil Chemists' Society 37, 475–478 (1960)

Primary Examiner—William H. Short
Assistant Examiner—E. Nielsen
Attorney—Cushman, Darby & Cushman

[57] ABSTRACT

Polymers are prepared by condensing a polyhydroxy monocarboxylic acid of formula $(OH)_nR-COOH$, wherein $n$ is an integer from two to six and R is a hydrocarbon radical containing up to 22 carbon atoms to which the hydroxyl groups are attached and optionally interrupted by or containing a hetero atom, with other condensable species which exclude those containing more than one carboxyl group or a group equivalent to more than one carboxyl group. The polymer per se or when attached to another moiety are useful in coating compositions.

3 Claims, No Drawings

CONDENSATION POLYMERS

BACKGROUND OF THE INVENTION

1. Field

This invention relates to condensation polymers, and in particular to condensation polymers which are useful in coating compositions.

2. Prior Art

The nature of condensation polymers prepared from monomeric species depend primarily on the functionality and relative proportions of the species concerned in the condensation reaction carried out to produce the polymers, and on the chemical nature and reactivity of the functional chemical groups in the species. In the preparation of alkyd resins, in which inter alia phthalic acid and glycerol are co-condensed, optionally with species of lower or higher functionality such as benzoic acid or pentaerythritol, useful polymers of high molecular weight are obtained only when the relative proportions of species of different functionality are carefully balanced. If the proportion of tri-functional or higher-functional species is too high, very highly crosslinked resins result from the condensation reaction, and these resins are unsuitable in coating compositions. Hence, when it has been desired hitherto to produce an alkyd resin containing a relatively high proportion of hydroxyl groups it has been usual to employ an excess of tri- or higher-functional polyol and to restrict the extent of condensation with the result that the resin is relatively low molecular weight.

When a monomer A – BB, (in which group A will condense with group B), is self-condensed, there is produced a condensation polymer in which each polymer molecule contains only one group A and a number of groups B, the number of B groups increasing with the number of monomer molecules taking part in the condensation. (see "Principles of Polymer Chemistry," page 361, by Flory; Cornell U.P. 1965). In this reaction the condensation polymer produced is highly branched, yet not inter-molecularly crosslinked (so that the formation of a gel is precluded), and the polymer is highly functional with respect to group B and only mono-functional with respect to group A. Monomer A – BB may also be co-condensed with monomer A – B to produce a polymer molecule which is still mono-functional with respect to A but which has fewer B groups.

Summary

We have now found that condensation polymers obtained by co-condensing certain monomer species which comprise certain monomers A – BB are useful in coating compositions. The condensation of these selected monomers may be taken to relatively high molecular weights and the excess of residual group B in the polymer provides a means whereby the polymer can be further increased in molecular weight, for example, after application of a composition to a substrate and optically with crosslinking.

Thus we provide a condensation polymer or a residue thereof, and a coating composition which comprises such polymer or residue obtained by condensing monomer species which comprise a polyhydroxymonocarboxylic acid for formula $(OH)_nR$—COOH, wherein $n$ is an integer from two to six and R is a hydrocarbon radical containing up to 22 carbon atoms, optionally interrupted by or containing a hetero atom, to which the hydroxyl groups are attached, but which species exclude those containing more than one carboxyl group or a group which is equivalent to more than one carboxyl group, for example a carboxylic acid anhydride group.

DETAILED DESCRIPTION

R may be, for example, a saturated hydrocarbon chain containing from two to 22 carbon atoms, the carboxyl group being attached to a terminal carbon atom and the hydroxyl groups attached to separate carbon atoms along the chain, as for example in glyceric acid, 9,10-dihydroxystearic acid, or trihydroxystearic acid.

Alternatively the radical R may be branched as represented by the structure $(HO—R^1)_nR^2$—COOH wherein $n$ is an integer from two to 5, $R^1$ is a hydrocarbon radical optionally containing or interrupted by a hetero atom and $R^2$ is a hydrocarbon radical optionally containing or interrupted by a hetero atom, to which the groups $(HO—R^1)$ are attached.

$(HO—R^1)$ may be, for example, $(HO—CH_2)$ or a polyethylene oxide residue, and $R_2$ may be, for example, a radical containing from one to six carbon atoms and optionally containing a hetero atom. An acid of this type which contains a hetero atom is N,N-(hydroxy ethyl glycine.

Particularly suitable condensation polymers, however, are those prepared by condensing monomer species which comprise a polyhydroxymonocarboxylic acid of structure

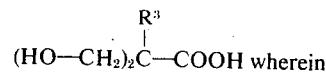

$R^3$ is a straight or branched alkyl group containing one to 12 carbon atoms or is —$CH_2OH$. Acids having this structure have previously been proposed for use in the preparation of certain condensation polymers, notably those polymers to be used in coating compositions dispersed in an aqueous medium where free carboxyl groups are required in the final polymer. In the prior condensation reactions, however, these polyhydroxymonocarboxylic acids have been co-condensed with polycarboxylic acids, for example phthalic acid, and the carboxyl group attached to a tertiary carbon atom has been found difficult to esterify, so that it remains substantially unesterified in the final polymer. We have found surprisingly that in the absence of a polycarboxylic acid the carboxyl group is readily esterified whether in self-condensation or co-condensation with, for example, mono-hydroxy mono-carboxylic acids or mono-amino mono-carboxylic acids. Moreover, an ester group which is adjacent to a tertiary carbon atom is less readily hydrolysed and undergoes ester-interchange or alcoholysis less readily than does an ester group not adjacent to a tertiary carbon atom. The last mentioned advantage is particularly significant when a condensation polymer according to this invention having a high hydroxyl content is to be subsequently esterified with a carboxylic acid since the polymer is resistant, under the esterfication conditions, to randomization to low molecular weight products.

Polyhydroxymonocarboxylic acids which contain a tertiary carbon atom and are of the above structure include dimethylol propionic acid, dimethylol butyric acid, dimethylol valeric acid and trimethylol acetic acid. The preferred acid is dimethylol propionic acid. Because of their low molecular weight and high hydroxyl content these acids permit the preparation of condensation polymers for use in coating compositions which have a high concentration of hydroxyl groups suitable for subsequent crosslinking or other modification, for example esterification with drying oil fatty acids, as discussed below.

The condensation polymers may be self-condensates of the polyhydroxymonocarboxylic acids, in which case highly branched polymers of high molecular weight and high hydroxyl content can be produced. The polyhydroxymonocarboxylic acids may also be co-condensed with mono-hydroxy mono-carboxylic acids and/or with mono-amino mono-carboxylic acids if it is desired to modify the self-condensate, for example in respect of molecular weight, branching, hydroxyl functionality or solubility in certain solvents. Suitable mono-hydroxy mono-carboxylic acids include 12-hydroxy stearic acid, 12-hydroxy oleic acid and lactic acid. Suitable mono-amino mono-carboxylic acids include glycine, 6-amino caproic acid, and 11-amino undecanoic acid.

The solubility and crosslinking potential of the present condensation polymers may be varied by varying the proportion and type of mono-hydroxy mono-carboxylic acid used in the co-condensation; the particular composition employed will be dictated by the end use. A self-condensate of dimethylol propionic acid, for example, has a hydroxyl value of approximately 480 mg KOH/g and is soluble only in polar solvents such as dimethyl formamide. On the other hand a co-condensate of one part dimethyl propionic acid and one part of 12-hydroxy stearic acid has a hydroxyl value of approximately 200 mg. KOH/g, is soluble in xylene/butanol, gives a highly crosslinked film with an aminoplast or alternatively is suitable to be esterified with soya bean oil fatty acid to yield an air-drying resin which is soluble in white spirit. A co-condensate of two parts dimethylol propionic acid and eight parts of 12-hydroxy stearic acid has a hydroxyl value of 80 mg. KOH/g and is similarly soluble in mixtures of xylene and butanol.

Mono-carboxylic acids, mono-hydroxy compounds, or polyhydroxy compounds may also be present in the condensation reaction but we prefer that the proportion of such monomer species is kept to a minimum. Suitable mono-carboxylic acids include lauric, oleic and benzoic acids and suitable mono-hydroxy compounds include butanol and decanol. Suitable polyhydroxy compounds include pentaerythritol. When it is desired to obtain a condensation polymer which contains the maximum number of carboxyl groups it is of course necessary to exclude the mono-hydroxy and polyhydroxy compounds.

While the presence of a mono-carboxylic acid in the condensation reaction may be useful in that it has the effect of limiting and thus, to some extent, controlling the molecular weight and branching of the polymer and of maintaining its solubility in the reaction solvent, it is preferred to produce a polymer suitable for use in coating compositions in which a condensation polymer of high molecular weight and containing a high proportion of hydroxyl groups has been post-reacted with mono-carboxylic acid. Preferably the mono-carboxylic acid is a drying oil fatty acid in order to produce a highly functional autoxidizable crosslinkable polymer as described below.

The condensation polymers may be prepared by conventional methods, for example by melt polymerization or polymerization in the presence of a solvent, the eliminated water being removed by azeotropic distillation. The conditions of reaction must be chosen such that etherification of hydroxyl groups, and resultant crosslinking is precluded. This is normally achieved by maintaining the reaction temperature below 200° C. and is a preferred method of preparation an esterification catalyst, for example zirconium naphthenate or dibutyl tin oxide, is employed at a reaction temperature of about 150° – 190° C.

The condensation polymers described in this specification and residues thereof and particularly useful as components of coating compositions since, in general, they contain a high proportion of hydroxyl groups which are crosslinkable under suitable conditions, for example with amino-plast or phenolic crosslinking resins and which also provide means for introducing crosslinking or crosslinkable residues, for example by esterification with drying oil residues. At the same time the molecular weight of such a condensation polymer applied to a substrate before crosslinking may be relatively high without incurring the risk of gelation during its preparation as with conventional alkyd resins and thus is still soluble in the conventional solvents. Although the condensation polymers per se may be used, it is often more convenient to attach such a polymer to another moiety, for example through an ester linkage to an addition polymer backbone, the residue of the condensation polymer conferring the advantages just mentioned.

When the condensed monomer species consist only of polyhydroxy mono-carboxylic acid and, optionally, mono-hydroxy mono-carboxylic acid and/or mono-carboxylic acid, mono- and polyhydroxy species being absent, the resulting condensation polymer is always monofunctional with respect to the carboxyl group. Such a polymer is valuable in chemical synthesis since it can be readily and unambiguously reacted through the carboxyl group by condensation with other co-condensable groups or the carboxyl group can be modified to provide a different reactable group. Thus, residues of the condensation polymers described in this specification may be attached to other chemical entities to provide useful materials, notably for use in coating composition. Alternatively, the single carboxyl group per se may be retained in the polymer, for example when the polymer is to be dispersed in an aqueous medium in the presence of a base.

Examples of reactions in which the carboxyl group is condensed with other groups include the reactions with an isocyanate, a mono-hydroxy or polyhydroxy compound or an epoxide. It may be desired, for example, to increase the hydroxyl functionality of the polymer and this may be achieved by post-reacting the polymer with a polyol such as pentaerythritol. The hydroxyl groups of the resulting polymer may then be esterified with an acid to introduce crosslinkable groups, for example, by esterification with a drying oil fatty acid. The high proportion of drying oil residues thereby introduced is of advantage in coating compositions which harden by an autoxidation mechanism. Other autoxidizable groups, for example allyl ether groups, may also be introduced into he polymers of this invention by reacting the hydroxyl groups with an intermediate containing such other groups. The hydroxy groups may also be crosslinked by reaction with aminoplast or phenolic resins, for example melamine/formaldehyde resins or with isocyanates, for example adducts of trimethylol propane and toluylene diisocyanate. The carboxyl-containing polymer may be reacted with the epoxide groups of an epoxy resin, the hydroxyl groups of such being optionally further esterified with carboxylic acid.

The carboxylic group of the polymer may be modified to provide in the polymer a different reactive group, for example a polymerizable ethylenically unsaturated group by reaction with glycidyl methacrylate or a similar monomer, an epoxide group by reaction with epichlorhydrin or a hydroxy ester group by reaction with a simple epoxide. Condensation polymers in which the carboxyl group has been replaced by a group comprising a polymerizable ethylenically unsaturated group may be copolymerized with polymerizable ethylenically unsaturated monomer(s) to produce a final polymer having a backbone of addition polymer and from which residues of condensation polymer as herein described are pendant. The addition polymer backbone may be of high molecular weight, and, through the hydroxyl groups contained in the pendant condensation polymer residues, the whole polymer may be subsequently crosslinked to produce a final polymer of very high molecular weight and complex structure which is highly resistant to degradation and chemical attack. Such crosslinking may be achieved, for example once applied to a substrate, by reaction with a crosslinking agent or alternatively by esterification of the hydroxyl groups with a drying oil fatty acid, the drying oil residues becoming crosslinked on exposure to air. These polymers are useful in coating compositions and one advantage over the conventional monomer-modified alkyd resins is that they are substantially free from addition polymer unmodified by condensation polymer and from unmodified condensation polymer. Consequently there is no problem in regard to the solvent compatibility of the addition polymer and condensation polymer components.

The condensation polymers of this invention and residues thereof are also useful in the preparation of dispersions of amphipathic copolymer aggregates, and coating compositions which comprise such dispersions, as described in our copending United Kingdom Pat. application Nos. 40643/69, 40644/69 and 40645/69. They are also useful in providing sites for the crosslinking of stabilizers which stabilize certain polymer dispersions as described in our copending United Kingdom Pat. application No. 33871/69.

The present polymer or residues thereof may also be used, for example as, or in the preparation of, pigment dispersants or plasticizers.

The invention is illustrated by the following examples in which parts and percentages are by weight unless otherwise stated.

EXAMPLE 1

In this example is described the preparation of a condensation polymer of dimethylol propionic acid. A mixture of 200 parts of dimethylol propionic acid, 80 parts of dimethyl formamide and two parts zirconium naphthenate was heated under reflux. Water of reaction was removed with the dimethyl formamide distillate. Further amounts of dimethyl formamide were adder to maintain reflux and the reaction continued until the acid value had fallen to 15 mg KOH/g resin. The final product was a clear, hard resin soluble only in strongly polar organic solvents such as dimethyl formamide and dimethyl acetamide, and having a melting point of about 70° C.

In a second preparation of polymer of dimethylol propionic acid was prepared by heating a mixture of 1,072 parts dimethylol propionic acid, 118 parts xylene and two parts methane sulphonic acid in a vessel fitted with a stirrer and Dean and Stark condenser. The temperature was maintained at 150° C. whilst water of esterification was removed. The polymer precipitated from solution as it formed. The reaction was stopped when 130 parts of water had been removed and the acid value of the resin had fallen to 21 mg KOH/g resin. The polymer was a hard glassy resin soluble in dimethyl formamide.

EXAMPLE 2

In this example is described the preparation of a condensation polymer of 9,10-dihydroxy stearic acid. 500 parts 9,10-dihydroxy stearic acid and 57 parts xylene were heated in a flask fitted with a stirrer, thermometer and water separator. Water of reaction was removed by azeotropic distillation whilst keeping the temperature of the reaction mixture below 190° C. 23 parts of water were removed. The product was a viscous polymer of acid value 22 mg KOH/g resin and hydroxyl value 166 mg KOH/g resin. The polymer was freely soluble in aromatic solvents and in mixtures of aliphatic hydrocarbon and lower alcohols, and had a melting point of below 20° C.

A blend of four parts of the poly(dihydroxystearic acid) in xylene solution with one part of a butylated melamine-formaldehyde resin in xylene/butanol solution was applied as a film to glass and stoved at 127° C for 1 hour. The resulting film was clear and slightly rubbery and was insoluble in common solvents.

EXAMPLE 3

In this example is described the preparation of a co-polyester of dimethylol propionic acid and 12-hydroxy stearic acid. 402 parts dimethylol propionic acid, 900 parts 12-hydroxy stearic acid, 145 parts xylene and 2.6 parts methane sulphonic acid were charged into a vessel fitted with stirrer, thermometer and water separator. The mixture was heated and the temperature maintained at 150° C. for 8 hours. A total of 110 parts of water were removed in this time. The product was a low viscosity solution of 85 percent resin content in xylene of acid value 33 mg KOH/g and hydroxyl value 93 mg KOH/g.

EXAMPLE 4

In this example is described the preparation of co-polyester of trimethylol acetic acid and 12-hydroxy stearic acid. 600 parts 12-hydroxy stearic acid, 150 parts trimethylol acetic acid, 89 parts toluene and 75 parts zirconium naphthenate (10 percents metal content) were charged to a flask with stirrer and water separator. The reaction mixture was heated and held under reflux at 160° – 170° C. In the early stages of the reaction the product set to a semi-crystalline solid on cooling but as the condensation proceeded the product became a clear viscous liquid. The final product was a pale golden polymer solution of 84 percent resin solids in toluene. The acid value of the polymer was 24 mg KOH/g.

EXAMPLE 5

In the example is described the preparation of an air-drying polyester from dimethylol propionic acid and linseed oil fatty acid. To a vessel fitted with stirrer, thermometer and water separator was charged 806 parts dimethylol propionic acid, 420 parts linseed oil fatty acid, 123 parts xylene and 12.3 parts zirconium naphthenate (10 percent metal content). The mixture was heated and held under reflux at 160° C. for 11 hours during which time the acid value dropped to 20 mg KOH/g resin and the hydroxyl value to 150 mg KOH/g resin. The product at this stage was a clear very viscous, resin solution of 90 percent non-volatile content. A further 1,035 parts linseed oil fatty acid and 100 parts xylene were added and the reaction continued for a further 8 hours. The acid value had dropped to 20 mg KOH/g resin indicating that essentially all the linseed oil fatty acid was esterified. The product was a low viscosity solution of 90 percent resin content.

Sufficient cobalt naphthenate and lead naphthenate solutions were added to a sample of the above resin solution without further dilution to give a level of 0.1% Co and 1% Pb calculated as metal on resin solids. This sample, when spread on glass as a film 100 $\mu$ thick, dried in 12 hours to a tough rubbery film resistant to solvents.

EXAMPLE 6

In this example is described the preparation of a thermosetting coating composition.

A. Preparation of polyester from dimethylol propionic acid and 12-hydroxy stearic acid.

726 parts 12-hydroxy stearic acid, 134 parts dimethylol propionic acid, 95 parts xylene and 8.6 parts zirconium naphthenate (10 percent metal content) were reacted as described in Example 1 to form a polyester A. of acid value 25 mg KOH/g resin and hydroxyl value 61 mg KOH/g as an 88 percent solution in xylene.

B. Preparation of polyester/glycidyl methacrylate adduct.

600 parts of the polyester solution from A, 40.2 parts glycidyl methacrylate, 0.5 parts of a commercially available dimethyl derivative of $C_{12-14}$ alkyl amine ('Armeen' DMCD, 'Armeen' is a Registered Trade Mark) and 0.15 parts hydroquinone, were charged to a flask fitted with stirrer, and heated at 130° – 140° C. for 3 hours. At the end of this time the acid value had fallen to 0.15 mg KOH/g resin indicating that essentially all the terminal carboxylic acid groups of the polyester had reacted with the epoxide ring of the glycidyl methacrylate. The resin solids content of this polyester/glycidyl methacrylate adduct B. solution was 51 percent.

C. Preparation of addition copolymer/polyester.

500 parts of toluene were charged into a stirred heated vessel and a mixture comprising 500 parts polyester/glycidyl methacrylate adduct B. solution, 100 parts methyl methacrylate, 100 parts styrene, 50 parts ethyl acrylate and 7.5 parts azo-bis-isobutyronitrile was fed into the refluxing toluene over one hour. Heating was continued for a further 2 hours to complete the polymerization. The final composition C. had a polymer solids content of 39 percent.

4 parts of this polymer solution were blended with one part of a 50 percent solution of a butylated melamine formaldehyde resin. A 50 $\mu$ thick film spread on glass was stoved at 127° C. for 30 minutes to give a clear, hard, tough, abrasion-resistant film which was insoluble in common solvents.

D. Preparation of a thermosetting paint.

A white pigment millbase was prepared by dispersing 15 parts polyester/acrylic/styrene copolymer solution C, 70 parts titanium dioxide, and 18 parts xylene in a sand mill until the dispersion was below 5 microns on a Hegmann gauge. To a mixer vessel containing 20.5 parts of a 50 percent solution of a butylated melamine formaldehyde resin in xylene and butanol was added slowly with stirring 30 parts white pigment mill base, 44 parts polyester/acrylic/styrene copolymer solution C, 0.2 parts 2 percent silicone oil solution in xylene, four parts butanol and five parts 3:1 xylene/butanol mixture. The above paint was diluted with xylene in the ratio 5:1 and sprayed onto undercoated panels which were then stoved for 30 minutes at 127° C. A hard, glossy, solvent-resistant coating was obtained.

EXAMPLE 7

In this example is described the preparation of an air-drying polyester.

A. Preparation of carboxyl-terminated polyester.

To a vessel fitted with a stirrer, water separator and reflux condenser and under nitrogen were charged 6,000 parts 12-hydroxy stearic acid, 1,330 parts dimethyl propionic acid, 73 parts zirconium napthenate (10 percent metal content) and 500 parts white spirit. The temperature was raised to 160° C. and under reflux 434 g. of water was removed over 7 hours when the reflux temperature had risen to 180° C. The resultant carboxyl terminated polyester A. had an acid value of 34 mg KOH/g the solids content of the product being 89 percent.

B. Preparation of polyester with terminal ethylenically unsaturated group. 7163 parts of a solution of polyester A (89 percent solids) 733 parts glycidyl methacrylate, 7 parts of a commercially available dimethyl amide of a $C_{12} - C_{14}$ fatty acid, (Armeen DMCD) 3.5 parts hydroquinone were heated at 150° C. for 4 hours. The product had an acid value of 0.35 mg KOH/g., a hydroxyl value of 115 mg KOH/g and a solids content of 87.5 percent.

C. Preparation of addition polymer/polyester.

Copolymerization of methyl methacrylate with macromonomer B. at a weight ratio of 1/0.26 using azo-diisobutyronitrile ADIB as initiator.

1,650 parts of ethyl acetate was charged to a vessel fitted with a stirrer and reflux condenser under nitrogen. The charge was heated to 78° C. (reflux) and over a period of 3 hours there was uniformly added 926 parts methyl methacrylate, 482 parts of the 87.5 solution of B and 2727 parts ADIB. The temperature was then held at 82° C. for a further 3 hours. The resultant polymer solution C had a solids content of 41.0 percent. This polymer was then esterified with tall oil fatty acids in the following manner.

D. Esterification.

To a vessel fitted with stirrer, water separator, and under nitrogen was added 2,888 parts polymer solution C at 41 percent solids, 237 parts tall oil fatty acid, seven parts zirconium naphthenate, and 150 parts white spirit. The temperature was raised to 200° C., ethyl acetate being stripped off to enable this temperature to be reached, and reflux continued for 8 hours during which time 15 g. water was removed. The resin D was then cooled and thinned to 46.1 percent solids with ethyl acetate.

To a sample of resin solution D was added cobalt naphthenate solution at a level of 0.05 percent cobalt metal on resin solids, and a film 100 $\mu$ thick spread on glass. A hard tough, flexible film was obtained on drying in air at room temperatures; after 24 hours drying the film had good resistance to xylol.

EXAMPLE 8

In this example is described the preparation of a block copolymer of a hydroxyl-containing polyester and an epoxy resin.

A polyester was prepared as in Example 1 from dimethyl propionic acid and 12-hydroxy stearic acid (1:1 molar ratio), 1,055 parts polyester (80 percent solution) 700 parts Epikote 1,004 (a commercially available epoxy resin of molecular weight 1,400 and equivalent weight 175 "Epikote" is a Registered Trade Mark), 1,345 parts cellulose acetate and 15.5 parts Armeen DMCD were heated under reflux at 150° C. for 5 hours. The acid value of the product had then fallen to 0.2 mg KOH/g resin as a result of the reaction between the terminal carboxylic acid group of the polyester and the epoxy resin.

A blend of this product with a melamine/formaldehyde resin at a ratio 3:1, block copolymer resin: melamine/formaldehyde resin spread as a 100 $\mu$ thick film on glass and stoved for 30 minutes at 150° C. gave a clear hard crosslinked film.

We claim:

1. A condensation polymer obtained by condensing at least one reactive monomer selected from the group consisting of (a) polyhydroxymonocarboxylic acids of the structure

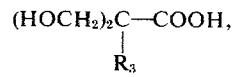

where $R_3$ is a straight or branched chain alkyl group containing one to 12 carbon atoms or is a —$CH_2OH$ and (b) mixtures of such polyhydroxymonocarboxylic acids with at least one other mono-carboxylic acid which also contains a single complementary reactive group selected from hydroxyl groups and amino groups.

2. A condensation polymer according to claim 1 wherein the polyhydroxymonocarboxylic acid is selected form the group consisting of dimethylol propionic acid, dimethylol butyric acid, dimethylol valeric acid and trimethylol acetic acid.

3. A condensation polymer according to claim 1 wherein the other mono-carboxylic acid which also contains a single complementary reactive group is 12-hydroxystearic acid.

* * * * *